United States Patent
Hess

(10) Patent No.: US 8,361,206 B2
(45) Date of Patent: Jan. 29, 2013

(54) GENERATOR HEAT RECOVERY FOR DIESEL FUEL HEATED DESSICANT REACTIVATION

(76) Inventor: Spencer W. Hess, Whiting, NJ (US)

( * ) Notice: Subject to any disclaimer, the term of this patent is extended or adjusted under 35 U.S.C. 154(b) by 106 days.

(21) Appl. No.: 12/927,667

(22) Filed: Nov. 22, 2010

(65) Prior Publication Data

US 2012/0125199 A1 May 24, 2012

(51) Int. Cl.
*B01D 53/02* (2006.01)
*F25B 47/00* (2006.01)

(52) U.S. Cl. ............ 96/125; 96/126; 96/146; 95/114; 95/117; 34/72

(58) Field of Classification Search .......... 62/271, 62/278; 96/146, 154; 34/72
See application file for complete search history.

(56) References Cited

U.S. PATENT DOCUMENTS

| | | | | |
|---|---|---|---|---|
| 4,113,004 A * | 9/1978 | Rush et al. | | 165/7 |
| 4,594,860 A * | 6/1986 | Coellner et al. | | 96/118 |
| 4,635,446 A * | 1/1987 | Meckler | | 62/271 |
| 4,813,632 A * | 3/1989 | Woodhouse | | 244/95 |
| 6,199,388 B1 * | 3/2001 | Fischer, Jr. | | 62/90 |
| 6,355,091 B1 * | 3/2002 | Felber et al. | | 95/10 |
| 6,415,617 B1 * | 7/2002 | Seem | | 62/186 |
| 6,575,228 B1 * | 6/2003 | Ragland et al. | | 165/54 |
| 6,652,628 B1 * | 11/2003 | Hess | | 95/113 |
| 6,675,601 B2 * | 1/2004 | Ebara | | 62/271 |
| 6,889,750 B2 * | 5/2005 | Lagace et al. | | 165/8 |
| 6,892,795 B1 * | 5/2005 | Steele | | 165/10 |
| 6,978,635 B2 * | 12/2005 | Yabu et al. | | 62/271 |
| 7,007,495 B2 * | 3/2006 | Lee et al. | | 62/271 |
| 7,022,167 B2 * | 4/2006 | Hess | | 96/108 |
| 7,073,566 B2 * | 7/2006 | Lagace et al. | | 165/8 |
| 7,284,385 B2 * | 10/2007 | Hess | | 62/271 |
| 7,284,386 B2 * | 10/2007 | Hess | | 62/271 |
| 7,284,387 B2 * | 10/2007 | Hess | | 62/271 |
| 2005/0076781 A1 * | 4/2005 | Hess | | 96/135 |
| 2006/0053817 A1 * | 3/2006 | Hess | | 62/271 |
| 2006/0060183 A1 * | 3/2006 | Hess | | 126/110 R |
| 2006/0064891 A1 * | 3/2006 | Hess | | 34/72 |

* cited by examiner

*Primary Examiner* — Duane Smith
*Assistant Examiner* — Christopher P Jones
(74) *Attorney, Agent, or Firm* — Charles I. Brodsky

(57) ABSTRACT

Dessicants employed in dehumidifying moisturized air present within a water-damaged building are themselves dehumidified to liberate collected moisture through the use of heated air vented from an on-site electric generator to be drawn over and about a heat exchanger fired by diesel fuel.

7 Claims, 2 Drawing Sheets

GENERATOR HEAT RECOVERY FOR DIESEL FUEL HEATED DESSICANT REACTIVATION

CROSS-REFERENCE TO RELATED APPLICATIONS

None.

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

NOT APPLICABLE

BACKGROUND OF THE INVENTION

1. Field of the Invention

This invention relates to the restoration industry, in general, and to the drying-out of water damaged buildings, in particular.

2. Description of the Related Art

As is well known and understood, many factors can adversely affect the indoor air quality of buildings, but nothing is as threatening to the indoor environment as water intrusion. As is also well known, when water damage occurs—be it as a result of a burst pipe, a leaky roof or windows, or a flood—it becomes essential to take immediate action. Otherwise, the contents of vital records can be ruined, operations can be disrupted, tenants can be displaced, rental income can be negatively impacted and such irreparable damage can be done as to result in costly repairs or even total loss. As is more and more being appreciated, the moisture can also feed mold growth—which, in itself, is such an onerous threat as to which no building becomes immune.

As is additionally well known and appreciated, water intrusion often occurs without warning—for example, as a result of hurricane flooding, when pipes burst (frequently in the middle of the night or when no one is around), or when roof air conditioning systems fail.

When water intrusion of this sort occurs, a professional disaster restoration services provider is summoned to immediately take action to stabilize the environment, mitigate loss, and preserve good indoor air quality. After first quickly identifying "totalled" contents and removing them from the building, the next step is to dry the air using dehumidification systems specifically engineered for that purpose. In particular, the use of dessicant dehumidification systems has grown in popularity as the most effective water abatement technology due to their ability to create low relative humidity and dew point temperatures inside a structure. Unlike cooking-based dehumidifiers (which cool the air to condense moisture and then draw it away), dessicants attract moisture molecules directly from the air and release them into an exhaust air stream. Able to attract and hold many, many times their dry weight in water vapor, such dessicants are very effective in removing moisture from the air at lower humidity levels, and do not freeze when operated at low temperatures.

As described in my U.S. Pat. No. 6,652,628 (which issued Nov. 25, 2003), mobile dessicant dehumidifiers have begun to be employed more and more in recent years to dry water damaged buildings to reduce health problems caused by the incipient mold which develops. As is there noted, silica gel is oftentimes employed as the dessicant in a wheel through which the moistened air is pulled from the walls, the floor, the concrete, etc. into the dehumidifying chamber. As the silica gel absorbs the moisture, it became necessary to additionally heat the dessicant to liberate the moisture it collects. Where large scale dessicant equipment is employed, the heat energy required is typically provided by electric heating or propane heating. However, problems existed with both those methods of reactivating the dessicant.

As my aforementioned patent went on to describe, electrical heating required a large amount of electric power, which many damaged buildings would not have available. Utilizing alternatively provided generators, on the other hand, added additional expense from their rental, along with an accompanying high fuel bill. Propane fuel dehumidifiers, moreover, exhibited many disadvantages of their own: a) Special permits were frequently required to transport the propane to the work site by trailer or other vehicle; b) Additional permits were oftentimes required for working with propane at the work site itself; c) A resupply of propane may not be readily available—as where the building being dried was at a remote location or when a resupply was needed in the middle-of-the-night, or on a Sunday; d) Firing the dehumidifier with propane produced a moisturizing effect which undesirably wetted the processed air being dried; and e) Propane, itself, was highly flammable.

My patent recognized the need to rapidly dehumidify water-logged buildings and their contents by recirculating air between the building involved and equipment employed—with the air being ducted from the building through the equipment (which absorbs moisture from the air to lower its humidity), and with the dried air being routed back into the building where it absorbs additional moisture from the surrounding air in the building and the building contents. Also recognizing that the recirculation process needs to be carried out continuously, 24 hours a day, until the building interior is determined to be sufficiently dry, such drying process needs to continue for a number of days—especially where a structure such as a hotel or office building has been damaged by water due to a storm or the extinguishment of a fire. However, in order for the dessicant to keep absorbing water, my patent further recognizes that the dessicant must be continuously heated to evaporate the water that it has absorbed. Thus, the equipment employed required an energy source or sources to (i) drive a processed air blower to recirculate air to and from the drying equipment and the building, (ii) drive a reactivation blower to direct heated ambient air through the dessicant, and (iii) heat the ambient air prior to its passing through the dessicant. For a hotel, office building, or other typical commercial building, relatively large amounts of energy continued to be required to heat the ambient air so as to keep the dessicant sufficiently dry—due to the high volumetric rates of air flow involved (measured in cubic feet per minutes).

As described in my issued patent, on the other hand, such firing of the heat exchanger to heat the air for evaporating moisture from the dessicant forswore the use of electric heaters or propane burners as previously employed, and proceeded by the burning of diesel fuel—or its equivalent of kerosene or No. 1 or No. 2 fuel oil. As there set out, the diesel fuel thus employed in the heating process was available virtually anywhere where diesel trucks served as a means of transportation. Because diesel fuel provided a greater amount of BTU's per gallon than propane, less fuel was required to provide the heat for the dessicant than with propane, resulting in a cost savings in use. Also, because such fuel burned without producing moisture, the processed air became that much drier, enabling the reactivation of the dessicant to be accomplished faster, thereby increasing performance in operation. And, because the dessicant dehumidifier of the invention operated more efficiently, its construction allowed for a reduction in the required horsepower of the reactivation blower pulling the ambient air over the heat exchanger—resulting in a more compact machine, for easier transportation.

SUMMARY OF THE INVENTION

While proper water abatement and recovery operations require professional assistance in being able to quickly assemble a cohesive work team, provide rapid emergency response time, provide a turnkey operation for recovery and restoration with guaranteed results through the removal of standing and excess moisture so as to speed return to occupancy and operation of an affected business, similar needs (albeit on a reduced scale) continue to be needed where the loss occurs in homes, townhouses, condominiums and apartments. There, rather than primarily concerning itself with structural drying, large loss recoveries and systematic project management, primary concern is with cleaning, sanitizing and disinfecting interior surfaces—contamination from mold, bacteria, mildew and potential biological hazard to the occupiers of the premises are of greater concern. As described in my published Application No. US-2006-0059938-A1 entitled Self-Contained Trailer for Diesel Fuel Heated Dessicant Reactivation, a self-contained trailer can be had, in which the dessicant drier is itself mounted along with all things needed for the restoration service in allowing the equipment to be driven from place-to-place like an emergency response ambulance whenever and wherever a need arises.

While such trailers work perfectly well, the present invention proceeds from the recognition that the dessicant must still be continuously heated to evaporate the water that it has absorbed—and that this must still be done where large structural drying is involved. And, the invention follows the realization that in both these utilizations, diesel powered generator equipment needs to be available at the site for providing the needed amounts of electric power to operate the dehumidifying apparatus and the various other equipments being used. In accordance with the teachings of the present invention, therefore, appropriate ducting is provided to use the exhaust of the generator and the excess heat from an included radiator to supplement the heating of the air that reactivates the silica gel wheel. As will be appreciated by those skilled in the disaster restoration field, such using of tubing from the generator represents a unique way of obviating the need to have the diesel or equivalent fuel burner on all the time to bring the heat up. Heating the air to reactivate the silica gel in this manner will thus be appreciated to represent a major cost savings at an inconsequential expense through the using of the generator heat recovery for dessicant dehumidification.

BRIEF DESCRIPTION OF THE DRAWINGS

These and other features of the present invention will be more clearly understood from a consideration of the following description, taken in connection with the accompanying drawings in which.

DETAILED DESCRIPTION OF THE INVENTION

Figure 1:
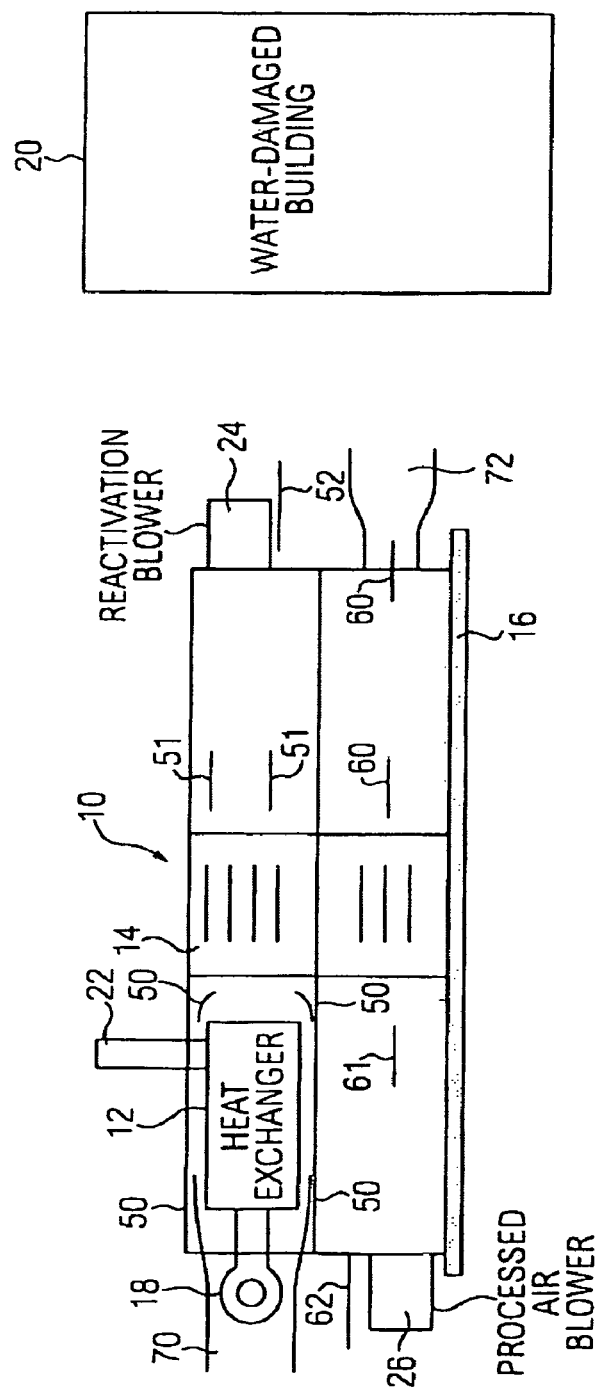
FIG. 1 is a block diagram helpful in an understanding of the apparatus and method of my U.S. Pat. No. 6,652,628 for dehumidifying air present within a building from a point external thereto.

FIG. 1 illustrates the dessicant reactivation apparatus of my aforesaid patent and its method of operation through the use of an enclosure 10 having a heat exchanger 12 and a dessicant 14. Reference numeral 20 identifies a building in which moisturized air is present which the apparatus of the invention is to dehumidify, with the enclosure 10 having a bottom surface 16 which may rest upon a trailer or truck bed adjacent the building 20 once driven to the work site. Alternatively, the enclosure 10 could be off-loaded from the trailer or truck bed onto the ground itself. Reference numeral 18 indicates a diesel fuel burner according to that invention, having an exhaust gas stack 22. As will be understood, the diesel fuel burner 18 heats the exchanger 12 from the inside out.

As described in such patent, a first, or reactivation, blower 24 draws ambient air from the surrounds via an 18-inch ductwork 70, for example, into the enclosure 10, over and about the diesel fired heat exchanger 12 and through the dessicant 14 in a first direction, as illustrated at 50; the moisture liberated, heated air through the dessicant 14 is discharged outside the enclosure 10 as shown by the arrows 51-52. A second, or processed air, blower 26 draws the moisturized air from within the building through like ductwork 72 and the dessicant 14 in a second direction (shown by the arrows 60), which traps the moisture therein before discharging the dried air out the enclosure 10 as shown by the arrows 61-62. The diesel fired heat exchanger 12 thus dehumidifies the dessicant of the moisture collected from the wet building air in reactivating the dessicant 14 for continuing use.

In this construction, the ambient air from outside the enclosure 10 is shown as being drawn through the dessicant 14 in a direction opposite to that in which the moisturized air is pulled from the building through the dessicant 14. In such manner of use, a dessicant 14 including a silica gel composition was particularly attractive in collecting the moisture from the water damaged building's air.

As will be appreciated by those skilled in the art, such operation follows from the use of the silica gel dessicant being in the form of a rotating wheel in a frame within the enclosure 10. The operation then follows by providing the dehumidifying chamber with the heat exchanger and the dessicant, drawing the ambient air from outside the building over and about the heat exchanger through the dessicant in a first direction, and drawing the moisturized air out from the building through the dessicant in a second, opposite direction. In accordance with this, for example, FIG. 1 shows the processed air blower 26 as pulling the moisturized air from the building right-to-left to be dried, whereas the reactivation blower 24 pulls the ambient air from left-to-right to liberate the moisture collected by the dessicant. Such construction is typically referred to as "direct firing", in which the heat from the burning chamber 12 passes directly through the dessicant.

Figure 2:
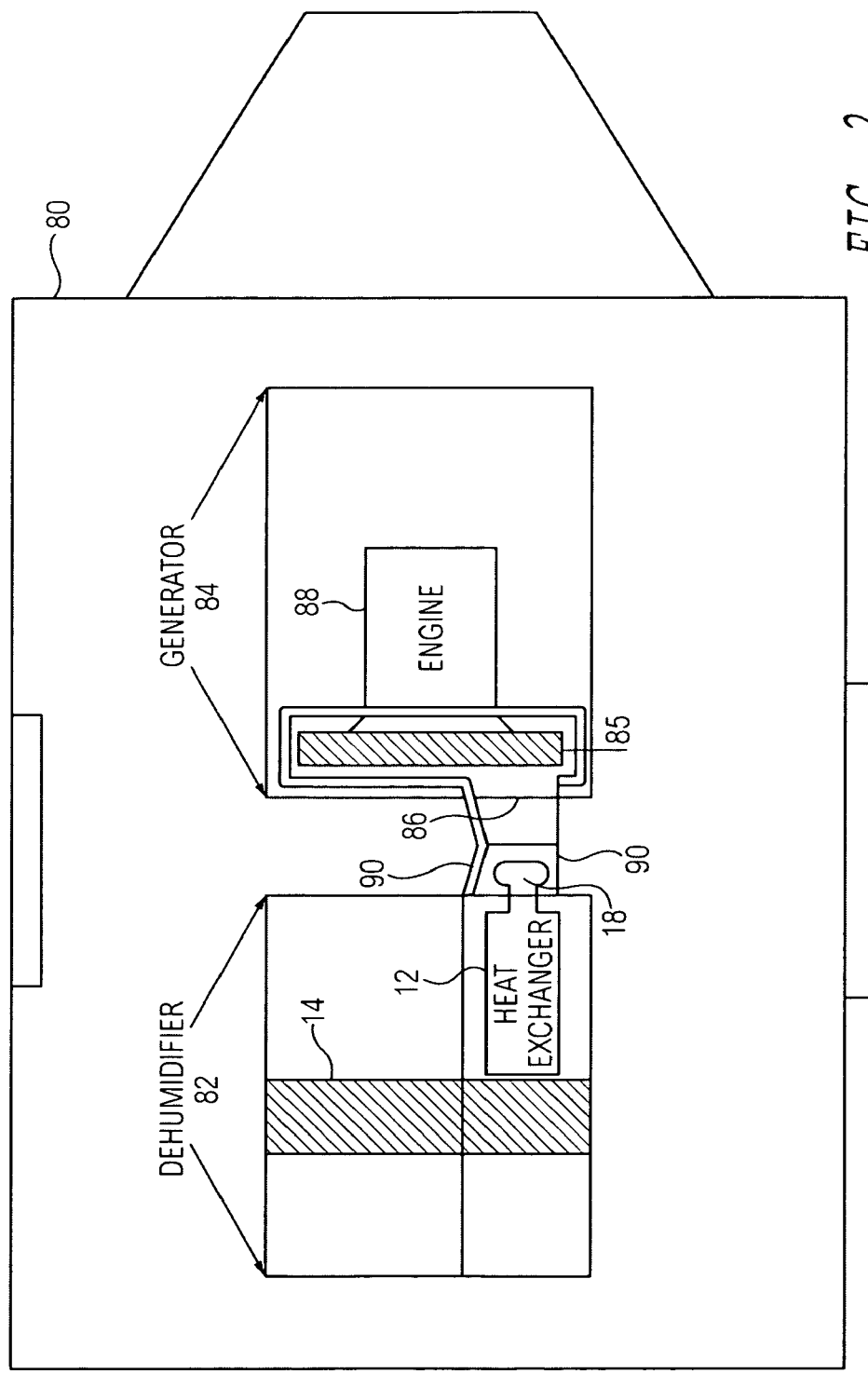
FIG. 2 illustrates the generator heat reactivation of the silica gel dehumidifier feature of the present invention.

FIG. 2 schematically illustrates the self-contained trailer described in my above-noted published Application No. US-2006-0059938-A1 for added use in the FIG. 1 heating of the exchanger 12 in dehumidifying the dessicant 14. With the trailer shown by the reference numeral 80, with its dehumidifying section shown at 82, and with its electric generator section shown at 84, a vent 86 collects the heat off a radiator 85 adjacent the generator's included engine 88 and diverts it through ducting 90 to the reactivation chamber in the dehumidifying section 82 where the diesel fuel burner 18 heats the exchanger 12. Supplementally heating the air going through to the heat exchanger 12 in this manner represents a significant cost savings in that the diesel fuel burner 18 does not have to be operating all the time, or to as high a state, to bring the heated air to the required level. Moreover, even if the burner were to go off and stop operating, with the generator heat radiator and ducting conduit, the heat exchanger would continue to work—and, as testing showed, at some 25% capacity. Simply utilizing plastic tubing for the ducting has been found to work appropriately well—and equally, where the dehumidifier and generator are simply set on a ground surface, instead of being within any self-contained trailer. As will be understood, the ducting 90 would be attached for use, and detached, if desired, for storage.

Moreover, the advantageous results above which follow have been found to exist in other types of dessicant dehumidifying apparatus described by me in others of my pending Applications which employ pre-dried reactivation air: Publication No. US-2006-0064891-A1 (Ser. No. 11/223,509), and Publication No. US-2006-0053808-A1 (Ser. No. 11/223,723); and in my Publication No. US-2006-0053817-A1 (Ser. No. 11/223,511) in which the moisturized air and the ambient air are drawn through the dessicant in the same direction, rather than in the opposite direction as in my U.S. Pat. No. 6,652,628 dessicant reactivator construction.

While there has been described what is considered to be a preferred embodiment of the present invention, it will be readily appreciated by those skilled in the art that modifications can be made without departing from the scope of the teachings herein of using the heated air vented by the generator employed in the reactivation to supplement the heat exchange to dry and dehumidify the moisture attracting dessicant. For at least such reason, therefore, resort should be had to the claims appended hereto for a true understanding of the scope of the invention.

I claim:

1. A combination comprising: apparatus for dehumidifying moisturized air present within a building from a point external thereto having an enclosure housing a heat exchanger, a dessicant, a first blower drawing ambient air from outside said enclosure over said heat exchanger through said dessicant in a first direction, a second blower drawing said moisturized air through said dessicant in a second direction, and means for firing said heat exchanger with diesel fuel; a generator for providing electrical energy to at least power said apparatus; and means for diverting heat radiated by said generator in operation to supplement the firing of said heat exchanger in drying the dessicant by the ambient air drawn by said first blower over said heat exchanger in said first direction.

2. The combination of claim 1 wherein said dessicant includes a silica gel composition.

3. The combination of claim 1 wherein first and second blowers draw said ambient air and said moisturized air through said dessicant in opposite directions.

4. The combination of claim 1 wherein said dehumidifying apparatus and said generator are included on one of a trailer and truck bed.

5. The combination of claim 1 wherein said heat radiating diverting means includes ducting conduit coupled between said generator and said heat exchanger firing means.

6. The combination of claim 5 in which said ducting conduit is detachably coupled for use and/or storage.

7. The combination of claim 5 including a heat radiator positioned between an engine of said generator and an input end of said ducting conduit remote from said heat exchanger firing means.

* * * * *